ically ilimsrimre [19] [11] 3,773,039
United States Patent
Mori et al. [45] Nov. 20, 1973

[54] ENDOSCOPE

[75] Inventors: Toshiyuki Mori; Takeshi Okada; Kunio Kinoshita; Teruo Ouchi, all of Tokyo, Japan

[73] Assignee: Olympus Optical Co., Ltd., Tokyo, Japan

[22] Filed: July 14, 1971

[21] Appl. No.: 162,509

[52] U.S. Cl. .................................. 128/6
[51] Int. Cl. ............................... A61b 1/06
[58] Field of Search .................. 128/6, 8, 4

[56] References Cited
UNITED STATES PATENTS

| | | |
|---|---|---|
| 1,431,902 | 10/1922 | Wolf ........................... 128/6 |
| 2,987,960 | 6/1961 | Sheldon ..................... 128/6 X |
| 3,090,379 | 5/1963 | Ferris et al. ................. 128/6 |
| 3,426,663 | 2/1969 | Fox ............................. 128/6 X |
| 3,556,085 | 1/1971 | Takahashi .................. 128/6 |
| 2,987,960 | 6/1961 | Sheldon ..................... 128/6 X |
| 3,256,875 | 6/1966 | Tsepelev et al. ........... 128/8 |

FOREIGN PATENTS OR APPLICATIONS 23,821   11/1902   Great Britain ......................... 128/8

*Primary Examiner*—Channing L. Pace
*Attorney*—Hans Berman

[57] ABSTRACT

A side viewing endoscope having a forward or distal end member adapted to be inserted into a cavity to be inspected and housing therein a reflecting mirror and an objective for receiving the light from an object located at the side of the distal end member so as to form an image of the object, a control housing connected to the distal end member through an elongated flexible tube and provided with an eyepiece, and an image transmitting optical system extending through the elongated flexible tube for transmitting the image of the object therethrough so as to be viewed through the eyepiece. The reflecting mirror is mounted on a ratchet rotated about the optical axis of the objective by a pawl actuated by an axial force.

9 Claims, 8 Drawing Figures

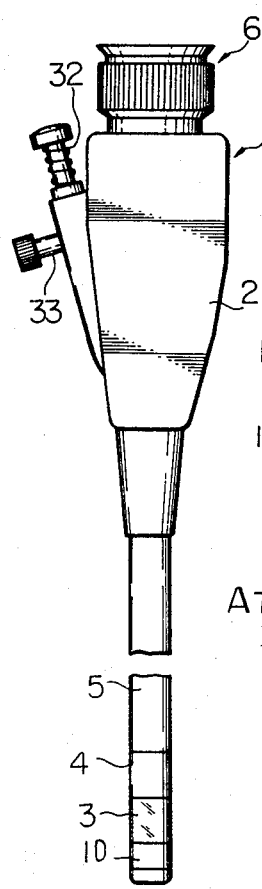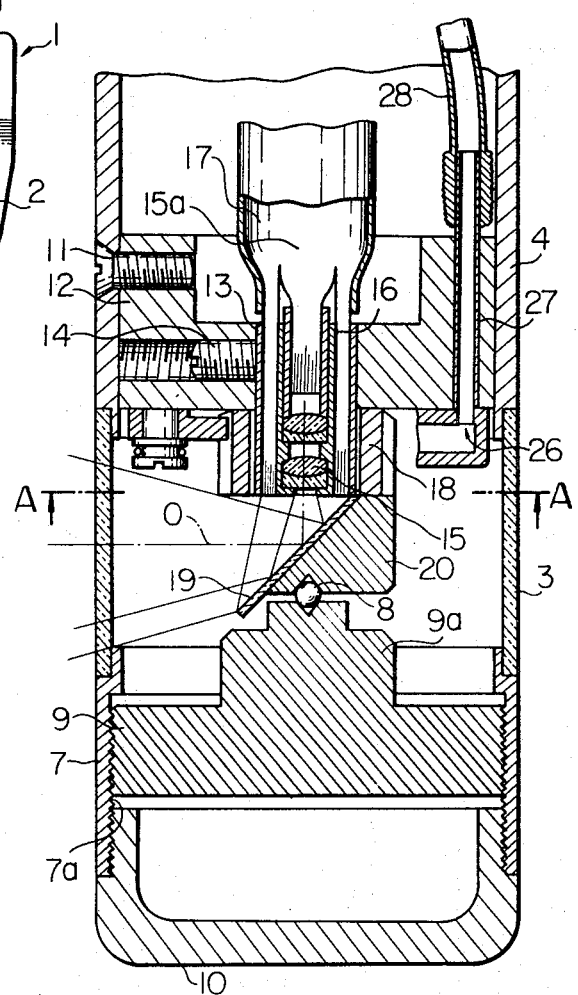

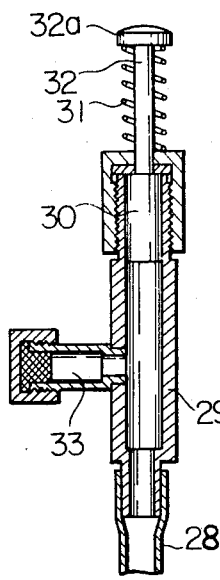
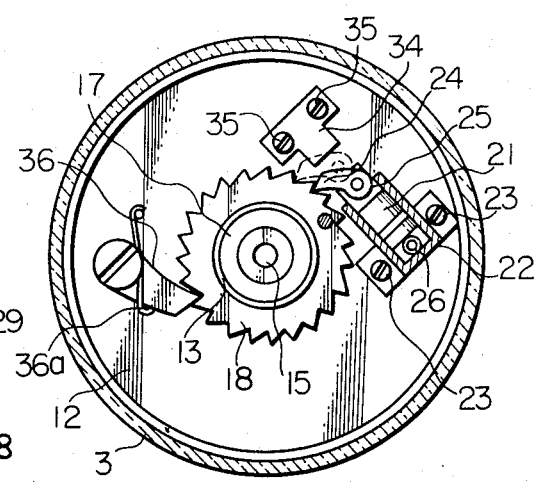
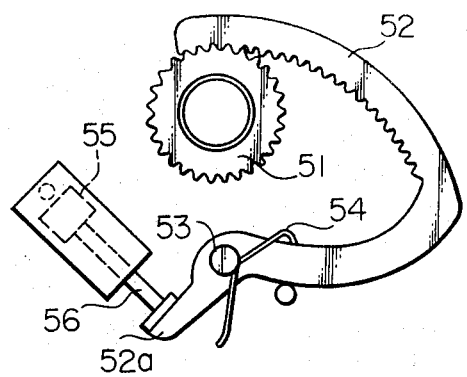

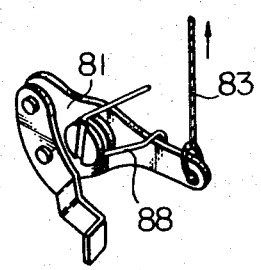
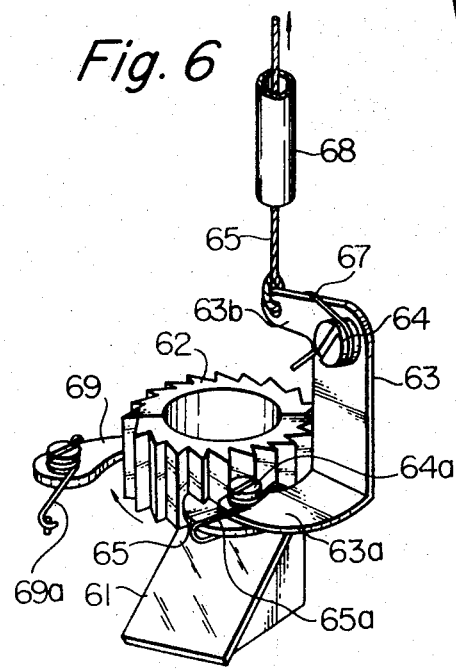
Fig. 6
Fig. 7
Fig. 8
INVENTORS
Toshiyuki Mori
Takeshi Okada
Kunio Kinoshita
Teruo Ouchi
BY Kelman and Berman,
AGENTS

ENDOSCOPE

BACKGROUND OF THE INVENTION

The present invention relates to a side viewing endoscope and, more particularly, to a device in a side viewing endoscope which permits viewing of an object located laterally of the longitudinal axis of the forward or distal end member of the endoscope in any direction around the longitudinal axis of the distal end member.

A well known side viewing endoscope is provided with a viewing window at a peripheral portion of the distal end member of the endoscope adapted to be inserted into a hollow portion to be inspected so that, when it is desired to observe an object located circumferentially of the distal end member in a direction different from that in which the viewing window is directed, the distal end member must be rotated about its longitudinal axis together with the elongated flexible tube connecting the distal end member to the external control housing of the endoscope so that the viewing window is properly directed to the object, thereby not only making the manipulation of the endoscope very troublesome and difficult but also causing pain to the patient to whom the endoscope is applied.

Heretofore, a side viewing endoscope has been proposed in which a twisting wire is provided extending through the elongated flexible tube and one end of the wire mounts thereon a pinion meshing with a gear rotatably supported in the distal end member about the longitudinal axis thereof on which the reflecting mirror is secured while the other end of the wire is connected to a control mechanism in the control housing so that the wire is twisted by the operation of the control mechanism to rotate the reflecting mirror through the pinion and the gear thereby permitting an object located laterally of the longitudinal axis of the distal end member in any direction around the distal end member to be observed by the rotation of the reflecting mirror without requiring the distal end member to be rotated about its longitudinal axis. However, the elongated flexible tube must be bent in various curvatures following the curvature of the narrow passage through which the distal end member is inserted into the hollow portion and, therefore, the twisting wire tends to be stuck to the wall in the elongated flexible tube when the twisted wire is twisted in the elongated flexible tube which is bent following the curvature of the passage thereby preventing the twisting force of the wire from being transmitted to the distal end on which the pinion is mounted, whereas the twisting force accumulated in the wire stuck to the wall in the elongated flexible tube might be suddenly released to rapidly rotate the reflecting mirror when the curvature of the elongated flexible tube is changed during the operation of the endoscope so that a smooth operation of the twisting wire can not be achieved. When the stiffness of the wire is increased in order to avoid the above difficulties, the yieldability of the elongated flexible tube is deteriorated so that the manipulation of the endoscope is made difficult while causing greater pain to the patient to whom the endoscope is applied.

The present invention aims at avoiding the above described disadvantages and providing a novel and useful side viewing endoscope which permits viewing an object located at the side of the distal end member in any direction around the axis thereof without requiring the forward or distal end member to be rotated about its longitudinal axis.

The above object is achieved in accordance with the present invention by the provision of a side viewing endoscope characterized by a rotatable member supported in the distal end member rotatably about the longitudinal axis thereof and mounting thereon the reflecting mirror, driving means in the distal end member coupled with the rotatable member and adapted to rotate the rotatable member when an axial force is applied to the driving means, and manually operable means in the control housing of the endoscope and operably coupled with the driving means so as to apply the axial force to the driving means when the manually operable means is actuated, so that the rotatable member is rotated together with the reflecting mirror by the actuation of the manually operable means thereby permitting an object located laterally of the distal end member in any direction therearound to be observed by the rotation of the reflecting mirror.

The manually operable means may be operably connected to the driving means by means of a fluid such as oil or may be connected by a string so as to apply an axial force from the manually operable means to the driving means.

Thus, the driving means is positively and smoothly actuated by the manually operable means regardless of the flexure of the elongated flexible tube connecting the distal end member to the control housing because the actuation of the driving means is effected by the axial force transmitted from the manually operable means.

BRIEF DESCRIPTION OF THE DRAWINGS

FIG. 1 is a general side view showing a side viewing endoscope incorporating the present invention;

FIG. 2 is a fragmentary sectional view showing the forward or distal end member of the endoscope shown in FIG. 1;

FIG. 3 is a fragmentary sectional view showing an embodiment of the manually operable means in the form of a fluid actuated device incorporated in the endoscope shown in FIG. 1;

FIG. 4 is a cross-sectional view along line A—A in FIG. 2 showing an embodiment of the driving means for rotating the reflecting mirror;

FIG. 5 is a fragmentary view showing another embodiment of the driving means of the present invention;

FIG. 6 is a fragmentary perspective view showing yet an other embodiment of the driving means of the present invention which is actuated by a string from the manually operable means;

FIG. 7 is a fragmentary perspective view similar to FIG. 6 but showing a further embodiment of ehdriving means of the present invention; and FIG. 8 is a fragmentary perspective view showing a modification of the embodiment of the driving means shown in FIG. 7.

DETAILED DESCRIPTION OF THE PEFERRED EMBODIMENTS

Referring to FIG. 1, the endoscope 1 incorporating therein the present invention comprises a control housing 2, a distal end member 4 adapted to be inserted into a body cavity to be inspected and having a transparent cylindrical viewing window 3, and an elongated flexible tube 5 connecting the end member 4 to the control housing 2.

As shown in FIG. 2, a reflecting mirror 19 and an objective lens system 15 are located in the distal end member 4 so as to receive the external light through the viewing window 3 and an image transmitting fiber optical system 15a extends through the elongated flexible tube 5 with its one end located in the image forming plane of the objective 15 while the other end of the image is located fiber optical system 15a terminates in the control housing 2. An eyepiece 6 is provided on the housing 2 behind the proximal end of the image transmitting fiber optical system 15a.

In order to illuminate the object, a light conducting fiber optical system 17 extends around the image transmitting fiber optical system 15a, its distal end terminating around the objective 15 and its proximal end extending beyond the control housing 2 so as to be connected to an external light source (not shown) directly or through another light conducting fiber optical system. Thus, the light emitted from the light source is transmitted through the light conducting fiber optical system 17 and reflected by the reflecting mirror 19.

As shown in FIG. 2, the transparent cylindrical viewing window 3 is secured between the end member 4 and a connecting ring member 7 having an internal thread 7a. A cap member 10 is threaded into the internal thread 7a of the connecting ring 7 so as to close the distal end of the viewing window 3.

A supporting member 12 is fixedly secured in the end member 4 by means of set screws 11. A cylindrical member 13 is fixedly secured in a central opening of the supporting member 12 coaxially therewith by means of a set screw 14. A lens barrel 16 supporting therein the objective 15 as well as a sleeve securing therein the image transmitting fiber optical system 15a is located concentrically in the distal end of the light conducting fiber optical system 17 as shown, and the light conducting fiber optical system 17 is in turn fixedly secured in the cylindrical member 13.

A ratchet wheel 18 is rotatably mounted on the cylindrical member 13 adjacent to the distal end surface of the supporting member 12 as shown in FIGS. 2 and 4. The ratchet wheel 18 carries a mirror supporting block 20, and the reflecting mirror 19 is secured to the block 20 at an angle of 45° with respect to the optical axis of the objective 15. As the ratchet wheel 18 is rotated about the optical axis, the mirror 19 is also rotated about the optical axis maintaining the angle of 45° between the optical axis and the surface of the mirror 19.

The block 20 is provided with a recess located in the optical axis. A ball 8 is supported in a recess formed in a central projection 9a of a receiving member 9 threadedly held in the connecting ring 7. The ball 8 engages the recess formed in the block 20 so that the block 20 is rotatably held by the ball 8.

The ball 8 held by the receiving member 9 also prevents the ratchet wheel 18 from being withdrawn from the cylindrical member 13 together with the block 20.

As shown in FIG. 4, a fluid actuated cylinder 22 provided with a piston 21 slidable therein is secured on the supporting member 12 adjacent to the periphery of the ratchet wheel 18 by means of screws 23. The piston 21 is provided with a driving member 25 at its outer end on which a ratchet driving claw 24 is rotatably supported. The ratchet driving claw 24 is engageable with the teeth of the ratchet wheel 18 and, when the cylinder 22 is actuated by the fluid introduced therein, the piston 21 is moved so as to rotate the ratchet wheel 18 by a pitch of the teeth thereof by means of the driving claw 24. In order to prevent the ratchet wheel 18 from being rotated backwardly after the same is rotated by the driving claw 24, a detent claw 36 is pivotally mounted on the supporting member 12 adjacent to the periphery of the ratchet wheel 18. A spring 36a ensures engagement of the claw 36 with the ratchet wheel 18. As shown in FIGS. 2 and 4, the cylinder 22 is provided with an opening 26 in which the distal end of a pipe 27 extending through a hole in the supporting member 12 is fitted. The proximal end of the pipe 27 is connected to a flexible pipe 28 extending through the elongated flexible tube 5 and connected to a master cylinder 29 provided in the control housing 2 as shown in FIGS. 1 and 3. A piston 30 is slidably fitted in the master cylinder 29 and a cap sealingly covering the master cylinder 29 and an operating knob or head 32a is secured to the outer end of the rod 32. A compression spring 31 is located around the rod 32 between the knob 32a and the cap of the master cylinder 29 so that the piston 30 is normally urged upwardly or outwardly as seen in FIG. 3 by the spring 31. A fluid pouring pipe 33 having a removable cap is connected to the cylinder 29 so that a fluid such as an oil may be introduced in the space in the master cylinder 29, the flexible pipe 28, the pipe 27 and the cylinder 22. Thus, when the knob 32a is manually pushed downwardly against the action of the spring 31, the fluid urges the piston 21 to actuate the driving claw 24 thereby rotating the ratchet wheel 18. When the knob 32a is freed, the piston 21 is moved back to retract the driving clas 24. A stopper 34 is adjustably secured to the supporing member 12 in front of the member 25 by means of screws 35 so that the stroke of the piston 21 is adjustable.

It is evident that the optical axis 0 of the mirror 19 can be directed to an object located at the side of the distal end member 4 without requiring the rotation of the distal end member 4 per se.

FIG. 5 shows a modification of the embodiment of FIGS. 2 – 4. In the embodiment of FIG. 5, the ratchet wheel 18 of FIG. 4 is replaced by a gear 51 and the driving claw 24 of FIG. 4 by a lever 52 pivoted on a pivot pin 53 and carrying on one arm a gear segment meshing with the gear 51. The other arm of the lever 52 is engaged by the piston rod 56 of a piston 55 similar to the piston 21 in FIG. 4, and normally urged by a spring 54 into engagement with the rod 56.

FIG. 6 shows a further embodiment of the present invention in which a string applies longitudinal force to the driving means of the reflecting mirror.

In the embodiment of FIG. 6, the mirror 61 is secured to a mounting block similar to the supporting block 20 in FIG. 2 and the mounting block is secured to a ratchet wheel 62 rotatably supported on the cylindrical member 13 as in the case of the embodiment of FIG. 2. A motion transmitting lever 63 is supported in the end member 4 by a pivot pin 64 and one end of a string 66 is connected to one arm 63b of the lever 63, while a driving claw or pawl 65 is secured by a pivot pin 64a at the tip of the other arm 63a of the lever 63 which is offset at right angles to the body of the lever 63. A spring 67 provided around the pivot pin 64 normally urges the lever 63 to move in an anticlockwise direction as seen in FIG. 6 while the driving claw 65 is urged in into engagement with the ratchet wheel 62 by a spring 65a provided around the pivot pin 64a. A detent claw 69 is engaged with the ratchet wheel 62 by a spring 69a.

The string 66 extends through the elongated flexible tube 5 and may be pulled by a manually operable device (not shown) provided in the control housing to apply a tensional force to the lever 63 against the action of the spring 67. Thus, the ratchet wheel 62 is rotated together with the mirror 61 by the driving claw or pawl 65. Guide member 68 secured to the interior of the end member 4 serves to smooth the action of the string 66 passing through the member 68.

FIG. 7 shows a motion transmitting gear 71 rotatable about the axis 79 and carrying a leaf spring 74 having a pawl 74a at the tip thereof. A rack 72 slidably guided in a guide member 77 secured in the end member 4 meshes with the gear 71. A string 73 is connected to the upper end of the rack 72 while a compression spring 78 is interposed between the guide member 77 and the upper end of the rack 72 so as to urge the rack 72 downwardly as seen in FIG. 7. The pawl 74a is normally engaged with a ratchet wheel 75 although illustrated in FIG. 7 as being separated for the clear showing of the arrangement. A detent 80 engages the ratchet wheel 75 while a reflecting mirror 76 is secured by a mounting block on the ratchet wheel 75.

In operation, when the string 73 is pulled by a manually operable actuating device in the control housing, the rack 72 is moved upwardly against the action of the spring 78 so as to rotate the gear 71, thereby rotating the ratchet wheel 75 together with the mirror 76. The operation is repeated until the mirror 76 is properly directed to the object to be inspected by the back-and-forth movement of the pawl 74a.

Finally, FIG. 8 shows a further modification of the embodiment of FIG. 7.

In this embodiment, the gear 71 and the rack 72 of FIG. 7 are dispensed with, and the pawl is directly attached to one arm of a two-armed motion-transmitting lever 81 pivoted to the interior of the end member 4. A string 82 is secured to the other arm of the lever 81 The lever 81 is normally urged by a spring 88 in the direction opposite to that in which the lever 81 is pulled by the string 83.

The operation of the embodiment of FIG. 8 is similar to that shown in FIG. 7.

We claim:

1. In an endoscope in combination:
   a. an elongated, flexible tubular member having a longitudinal axis and longitudinally terminal distal and proximal portions, said distal portion being formed with an opening extending circumferentially about said axis;
   b. a transparent window sealing said opening;
   c. a ratchet wheel mounted in said distal portion for rotation about said axis;
   d. a mirror having a face axially reflecting light entering said distal portion through said window, said mirror being mounted on said wheel for rotation therewith;
   e. a system of light conducting fibers elongated in said tubular member between said distal and proximal portions;
   f. objective lens means fixedly secured in said distal portion for focusing the light reflected by said mirror on a longitudinal end portion of said system in said distal portion for transmission to said proximal portion; and
   g. operating means for rotating said ratchet wheel, said operating means including
      1. a flexible tension member longitudinally extending in said tubular member between said proximal and distal portions and longitudinally movable in said tubular member;
      2. a pawl member mounted in said distal portion for back-and-forth movement circumferential relative to said ratchet wheel;
      3. yieldably resilient means biasing said pawl member toward driving engagement with said ratchet wheel; and
      4. motion transmitting means operatively interposed between said tension member and said pawl member in said distal portion for moving said pawl member in said circumferential direction in response to longitudinal movement of said tension member toward said proximal portion, and for thereby rotating said mirror about said axis.

2. In an endoscope as set forth in claim 1, said motion transmitting means including a motion transmitting member mounted on said distal portion for angular movement about an axis transverse to the axis of said tubular member and connected to said tension member for angular movement thereby, said pawl member being mounted on said motion transmitting member.

3. In an endoscope as set forth in claim 2, said motion transmitting member being a lever having an arm attached to said tension member.

4. In an endoscope as set forth in claim 3, said pawl member being pivotally mounted on said lever.

5. In an endoscope as set forth in claim 2, said pawl member being fixedly mounted on said motion transmitting member.

6. In an endoscope as set forth in claim 2, a detent engaging said ratchet wheel and preventing movement of said ratchet wheel with said pawl member during longitudinal movement of said tension member away from said proximal portion.

7. In an endoscope as set forth in claim 2, yieldably resilient means opposing said moving of said pawl member in response to said longitudinal movement of said tension member.

8. In an endoscope as set forth in calim 7, said tension member being a string.

9. In an endoscope as set forth in claim 7, said motion transmitting member being a gear, said motion transmitting means further including a rack member secured to said tension member and meshing with said gear.

* * * * *